Oct. 9, 1923.

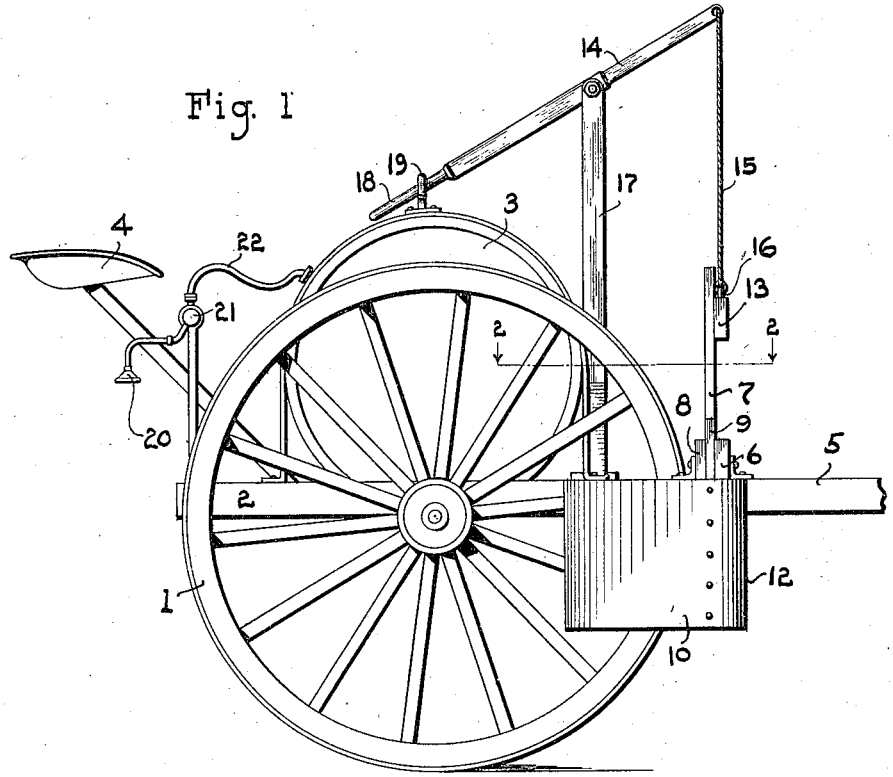
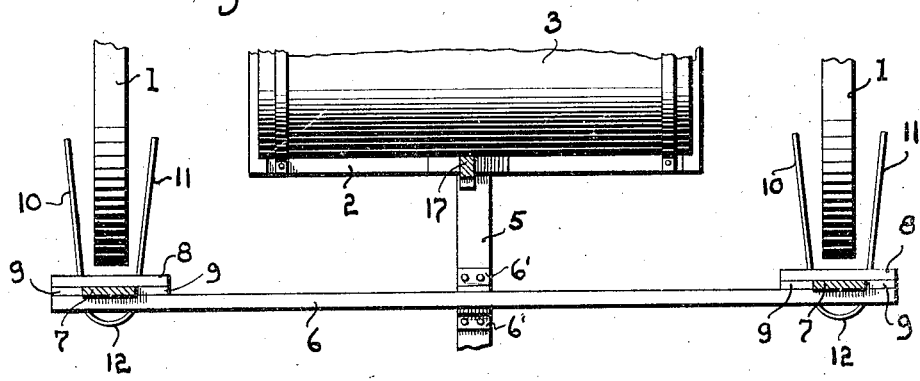

W. A. McKENNEY

ATTACHMENT FOR SPRAYERS

Filed Oct. 17, 1921

Walter A. McKenney
INVENTOR

WITNESSES
Frank B. Cook
Harry E. Seidel

BY

ATTORNEY

Patented Oct. 9, 1923.

1,469,801

UNITED STATES PATENT OFFICE.

WALTER ALBERT McKENNEY, OF CORINNA, MAINE.

ATTACHMENT FOR SPRAYERS.

Application filed October 17, 1921. Serial No. 508,412.

*To all whom it may concern:*

Be it known that I, WALTER A. MCKENNEY, a citizen of the United States, residing at Corinna, in the county of Penobscot and State of Maine, have invented new and useful Improvements in Attachments for Sprayers, of which the following is a specification.

This invention relates to spraying devices, and is more particularly directed to fenders for protecting the plants from the wheels of the sprayer.

Since potato vines or any vines of the same type which it is necessary to spray, have a tendency to spread outwardly from the rows in which they are planted and within the path of the wheels of the spraying device, some form of protection is necessary to prevent injury to the plants by the wheels of the sprayer, and it is an object of this invention to provide a new and improved means by which the vines are lightly but safely brushed to one side of the wheels to prevent the wheels from crushing the tender tops of the vines.

It is also an object to provide a new and improved operating means for placing the fenders in an inoperative or operative position before the wheels.

The adaptability of the fender is such that it may be employed on any device ordinarily used in connection with work along rows of plants and where there is danger of injuring the plants by the wheels of said device.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Fig. 1 is a side elevation of the sprayer showing the fenders in an elevated inoperative position with respect to the wheels of the sprayer.

Fig. 2 is a horizontal section taken along the line 2—2 of Fig. 1.

Figure 3:
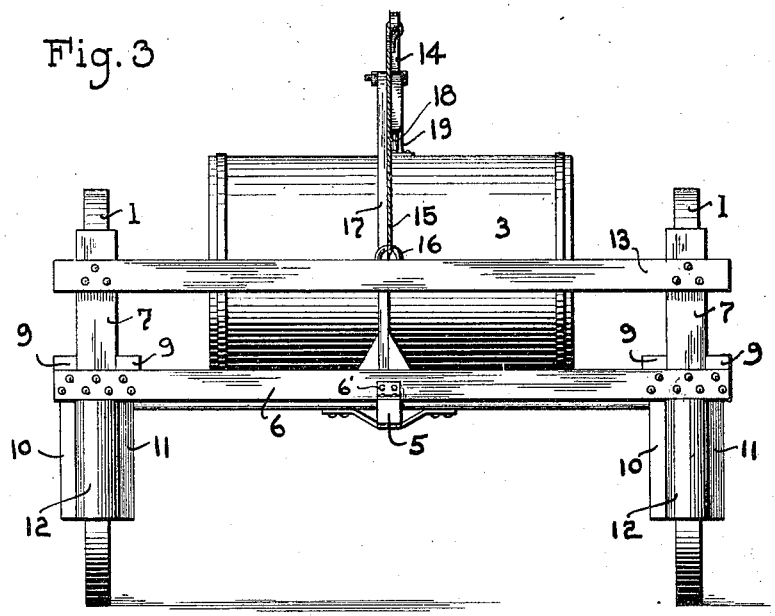
Fig. 3 is a front elevation with parts of the spraying device removed, disclosing the fender in an inoperative position.
Figure 4:
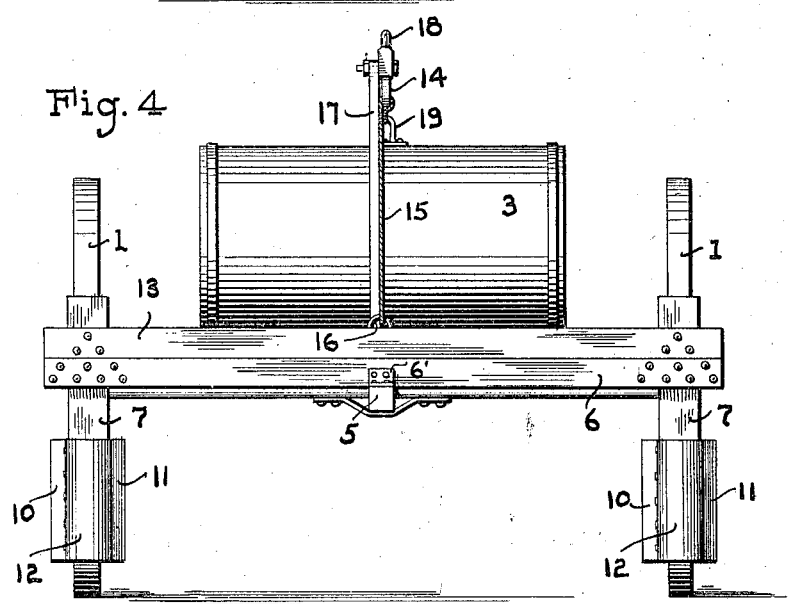
Fig. 4 is a front view of the spraying device disclosing the fenders in an operative position relative to the wheels of the sprayer.

Referring to the drawings, it will be seen that only such parts of the sprayer are disclosed as are necessary to properly illustrate applicant's invention, and in which 1 designates wheels supporting a frame or body 2, upon which is mounted a cask 3 containing liquid for spraying vines, and a seat 4 for the driver of the vehicle. A tongue 5 extends forwardly from the body of the sprayer and rigidly supports a transverse bar 6. Angle irons 6' fasten the bar 6 on the tongue 5. Upon the outer ends of said bar are secured guides in which are reciprocated arms 7, the guides comprising an outer plate 8 spaced from the bar 6 by means of blocks 9. Upon the opposite edges of the arms 7 are fastened sides 10 and 11 of a U-shaped fender 12 in any approved manner, as by screws, nails or bolts.

The upper ends of the arms 7 are fastened to the outer ends of a transverse bar 13 by which the fenders are adapted to be carried upwardly and in an inoperative position, as shown by Figs. 1 and 2. The arms 7 are slidable in the guides at right angles to the bar 6. A lever 14 and a cable 15, which is secured at one end to the outer free end of the lever 14, and at its outer end to a staple 16 mounted centrally of the transverse bar 13, comprise the operating means for elevating the bar 13 and likewise the fenders 12. The lever 14 is pivotally mounted upon the upper end of a vertical standard 17 secured at its base to the frame or body of the sprayer 2. A hand grip 18 of the lever 14 is adapted to be held in its lowermost position in a hook 19 upon the top of the cask 3 to maintain the fenders in their inoperative positions.

A plurality of spraying nozzles 20, having connection with a pipe 21 supported transversely of the vehicle, are spaced in such a manner as to direct the spraying fluid from the tank upon the vines in a number of rows simultaneously. Conduits 22 form connections with the pipe 21 and the cask 3.

The operation of my device is as follows:

As shown in Fig. 1, the fenders 12 are located in an inoperative position with the bar 13 in its most elevated position and the hand grip 18 engaged by the hook 19. The fenders are maintained in this position while travelling to or from a patch, or at times when it is not necessary for the protection of plants against injury from the wheels 2.

Before entering a field planted with rows of potatoes, or before driving through the potato patch, the hand grip 18 is released from the hook 19, when the weight of the fenders, the arms 7 and the bar 13 will cause the fenders to descend to their lowermost position and in operative relation with the wheels for protecting the plants. The bar 13, upon which the arms 7 are secured, will rest on and in alinement with the bar 6 and therefore act as a stop to prevent further descent of the fenders 12. In this operative position of the fenders, they will be located sufficiently above a horizontal plane passing through the lowermost points of the rims of the wheels, to hold the fenders from engagement with the soil but sufficiently depressed to safely and effectively direct the vines away from the wheels of the sprayer.

What is claimed is:—

1. The combination with a wheeled vehicle having vertical spaced guideways in a transverse plane in front of the wheels, of vertical supporting arms slidably mounted in said guideways and having fenders secured to their lower ends, said fenders being in operative position and partially embracing the respective wheels when the arms are in their lowermost position, means rigidly connecting the arms at their upper ends, means for raising the arms and the fenders to inoperative position, and means for locking them in that position.

2. The combination with a wheeled vehicle having a transverse bar rigidly mounted in front of the wheels, with vertical spaced guideways therein, of vertical supporting arms slidably mounted in said guideways and having fenders secured to their lower ends, said fenders being in operative position and partially embracing the respective wheels when the arms are in their lowermost position, a transverse bar rigidly secured to the upper ends of the arms and serving in conjunction with the first-named transverse bar as a stop to limit the downward adjustment of the fenders, a cable connected at one end to the second-mentioned transverse bar, a lever connected to the other end of the cable and operable by the driver to raise the arms and fenders to inoperative position, and means engageable with the lever for locking the parts in that position.

3. In a spraying device, the combination of spaced-apart fenders slidably mounted before the front wheels of the sprayer, a transverse bar provided with guides, arms projecting upwardly from each fender and slidable in said guides, a second bar located transversely in front of the sprayer and having its ends secured to the free ends of the arms, the second bar being adapted to rest on the first bar when the fenders are in operative position before the wheels, and means for raising the second-mentioned bar.

4. In a spraying device, the combination of spaced-apart fenders slidably mounted before the front wheels of the sprayer, a transverse bar provided with guides, arms projecting upwardly from each fender and slidable in said guides, a second bar located transversely in front of the sprayer and having its ends secured to the free ends of the arms, the second bar adapted to rest on the first bar when the fenders are in operative position before the wheels, and means for raising the second-mentioned bar, said operating means comprising a standard, a lever pivotally mounted on the standard, the outer free end of the lever being operatively connected with the second bar, the other end of the lever providing a hand grip adapted to be rocked by the operator of the spraying device for positioning the fenders.

5. In a spraying device provided with wheels, the combination of a bar rigidly mounted before the wheels and provided with guides in which are slidably mounted upwardly projecting arms, fenders in partial embracing relation with the wheels and secured to the lower ends of the arms, a second transverse bar secured to the upper ends of said arms, and means for moving the second transverse bar to position the fenders in plant protecting relation with the wheels, said means being adapted to be operated from the seat of the driver.

6. In a spraying device, the combination with movable fenders for protecting the plants to be sprayed, said fenders comprising U-shaped members, the sides of the U-shaped members being adapted to be positioned on opposite sides of the wheels of the spraying device, a bar rigidly mounted upon the front of the spraying device provided with guides upon its outer ends, arms slidably mounted within the guides, the U-shaped fenders embracing the lower ends of the slidably mounted arms, the sides of the U-shaped fenders being secured to the opposite vertical edges of the arms, a bar secured to the upper ends of the arms, and means for operating the second bar and the arms in the guides to maintain the fenders in a plurality of positions.

7. In a spraying device, the combination of spaced apart fenders slidably mounted before the front wheels of the sprayer, a transverse bar provided with guides, arms projecting upwardly from each fender and slidable in said guides, a second bar located transversely in front of the sprayer and having its ends secured to the free ends of the arms, the second bar adapted to rest on the first bar when the fenders are in operative position before the wheels, and means for raising the second mentioned bar, said first bar operating as a stop to position the fenders in their lowermost operative position, and means for locking the operating means in position to maintain the fenders in an elevated inoperative position.

In testimony that I claim the foregoing as my own, I have hereto affixed my signature.

WALTER ALBERT McKENNEY.